United States Patent
Chen

(10) Patent No.: US 6,826,045 B2
(45) Date of Patent: Nov. 30, 2004

(54) MOUNTING APPARATUS FOR DATA STORAGE DEVICE

(75) Inventor: Li Ping Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/367,041

(22) Filed: Feb. 13, 2003

(65) Prior Publication Data

US 2004/0125555 A1 Jul. 1, 2004

(30) Foreign Application Priority Data

Dec. 31, 2002 (TW) .......................................... 91221592

(51) Int. Cl.⁷ ................................................ G06F 1/16
(52) U.S. Cl. ........................ 361/685; 361/683; 361/727
(58) Field of Search ................................. 361/683, 684, 361/685, 686, 724, 725, 727, 741, 756, 759, 798, 754; 312/223.1, 223.2

(56) References Cited

U.S. PATENT DOCUMENTS 5,262,923 A  * 11/1993 Batta et al. ................. 361/685
6,469,889 B1 * 10/2002 Gan ............................ 361/685
6,590,775 B2 *  7/2003 Chen .......................... 361/725
6,659,292 B2 * 12/2003 Gough et al. ................. 211/26

* cited by examiner

Primary Examiner—Anthony Dinkins
Assistant Examiner—Carmelo Oliva
(74) Attorney, Agent, or Firm—Wei Te Chung

(57) ABSTRACT

A data storage device mounting apparatus includes a retaining bracket (20) fixedly mounted to a computer chassis (10), two slide rails (40) attached to opposite sides of a data storage device (50), and a resilient operation body (30). The retaining bracket includes two opposite side plates (21, 22) each defining a long slot (24). Each slide rail includes protrusions (42) slidably engaging in a corresponding slot. One side plate includes a detent tab (28). One slide rail includes a blocking tab (46). The operation body is fixed to one side plate, and includes an inward projection (33). When the data storage device is slid into the retaining bracket, the projection snappingly engages with the blocking tab, to prevent accidental withdrawal of the data storage device from the retaining bracket. The detent tab abuts an end of the data storage device, to prevent the data storage device from moving further inwardly.

16 Claims, 3 Drawing Sheets

MOUNTING APPARATUS FOR DATA STORAGE DEVICE

BACKGROUND OF THE INVENTION

1. Field of the Invention

The present invention relates to computer enclosures, and particularly to a computer enclosure having a mounting apparatus for readily attaching a data storage device therein.

2. Related Art

When a conventional personal computer is assembled, a drive bracket is firstly mounted in an enclosure of the computer. Data storage devices such as a hard disk drive (HDD), a floppy disk drive (FDD) and a compact disk read only memory (CD-ROM) drive are then attached to the drive bracket.

The drive bracket is typically secured to the enclosure by riveting or using a plurality of screws. U.S. Pat. No. 5,447, 367 discloses a conventional drive bracket, which is attached to a computer enclosure with screws. A screwdriver is required. This is inconvenient and time-consuming, and particularly costly in mass production facilities. Furthermore, during assembly, extra operation space for manipulating the screws is needed. This militates against the modern trend toward reducing the size of computers. Moreover, screws can be accidentally lost during assembly. Similar problems are experienced when rivets are used instead of screws. A riveter is required, and extra operation space for manipulating the rivets is needed. Rivets can be accidentally lost during assembly.

Thus an improved mounting apparatus for data storage devices which overcomes the above-mentioned problems is desired.

SUMMARY OF THE INVENTION

Accordingly, an object of the present invention is to provide a mounting apparatus for easy and convenient installation and removal of data storage devices into and from a computer enclosure.

Another object of the present invention is to provide a mounting apparatus which does not require additional fasteners for attachment of a data storage device in a computer enclosure.

To achieve the above-mentioned objects, a data storage device mounting apparatus in accordance with a preferred embodiment of the present invention comprises a retaining bracket fixedly mounted to a chassis of a computer, a pair of slide rails attached to opposite sides of a data storage device, and a resilient operation body. The retaining bracket comprises a base frame, and respective first and second side plates extending upwardly from opposite edge portions of the base frame. A long slot is defined in each of the first and second side plates, spanning from a rear end thereof. Each siding rail comprises a pair of protrusions slidably engaging in a corresponding slot. The first side plate comprises a detent tab at a front end thereof. A blocking tab extends from one of the slide rails that corresponds to the first side plate. The operation body is fixedly attached to the first side plate, and comprises an inward projection. When the data storage device is slid forwardly into the retaining bracket, the projection of the operation body snappingly engages with the blocking tab. This prevents the data storage device from being accidentally withdrawn from the retaining bracket in a rearward direction. The detent tab abuts a front end of the data storage device, thereby preventing the data storage device from moving further forwardly. The data storage device is thus securely mounted to the chassis via the retaining bracket.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
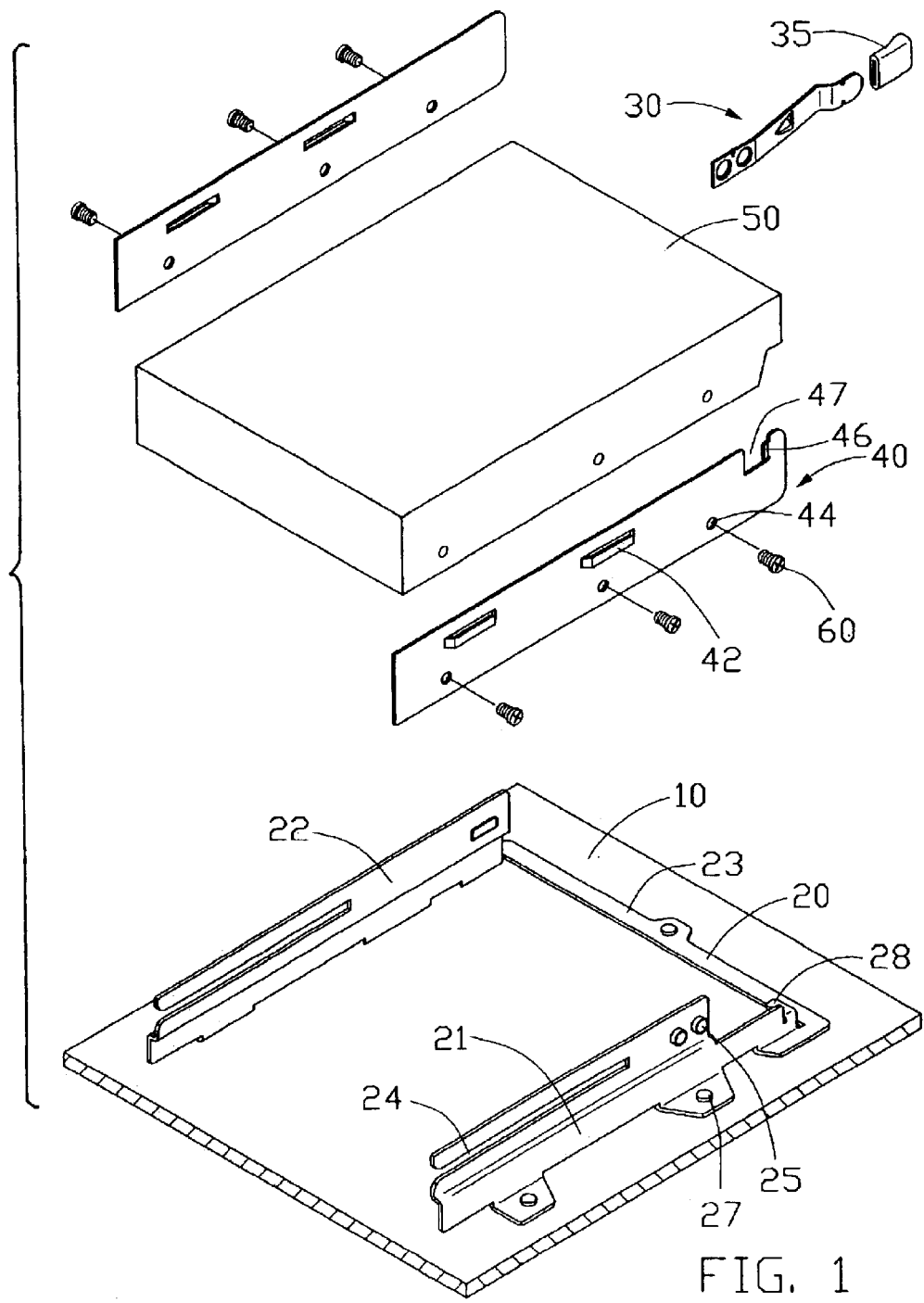
FIG. 1 is an exploded, isometric view of a data storage device mounting apparatus in accordance with the preferred embodiment of the present invention, together with a data storage device and a chassis of a computer.
Figure 2:
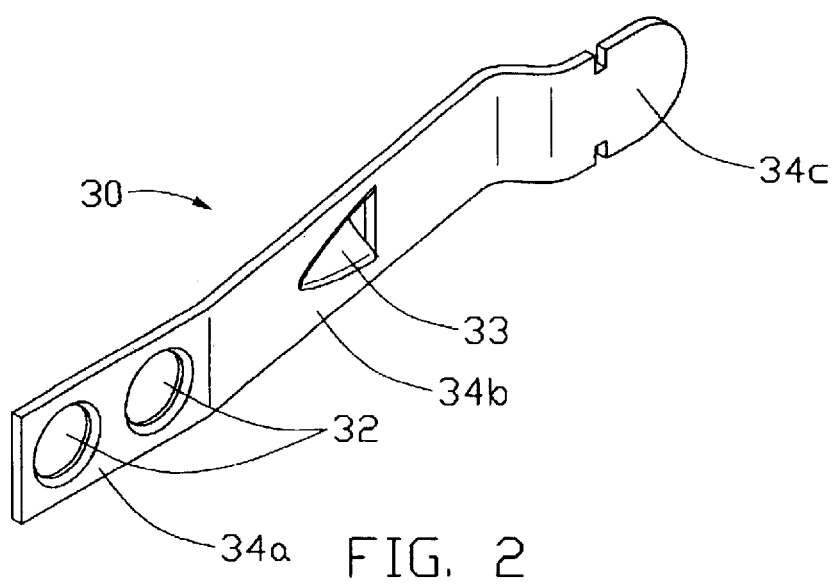
FIG. 2 is an enlarged view of an operation body of the data storage device mounting apparatus of FIG. 1.

Referring to FIGS. 1 and 2, a data storage device mounting apparatus in accordance with a preferred embodiment of the present invention comprises a retaining bracket 20 fixed to a chassis 10 of a computer (not shown), a pair of symmetric slide rails 40 for attaching to opposite sides of a data storage device 50, and an operation body 30 for attaching to the retaining bracket 20.

The retaining bracket 20 comprises a base frame 23 mounted to the chassis 10 with a plurality of fasteners such as rivets 27, and respective first and second side plates 21, 22 bent upwardly from opposite edge portions of the base frame 23. A long narrow slot 24 is defined in each of the first and second side plates 21, 22, spanning from a rear end thereof. A pair of hollow mounting posts 25 extends outwardly from a front portion of the first side plate 21. A detent tab 28 is bent inwardly from a front end of the first side plate 21.

Each slide rail 40 defines a plurality of aligned through holes 44 along a lengthwise direction thereof, the through holes 44 corresponding to positioning holes (not labeled) defined in respective opposite sides of the data storage device 50. The slide rails 40 are attached to the opposite sides of the data storage device 50 with a plurality of fasteners such as screws 60. A pair of aligned protrusions 42 is stamped outwardly from an upper portion of each slide rail 40, for engaging in a corresponding slot 24 of the retaining bracket 20. A cutout 47 is defined in an upper front portion of one of the slide rails 40 that corresponds to the first side plate 21. A blocking tab 46 extends rearwardly and slightly outwardly from said one of the slide rails 40 at a front extremity of the cutout 47.

The operation body 30 is made from resilient material such as plastic. The operation body 30 comprises rear, middle and front portions 34a, 34b, 34c integrally joined together at respective bent junctions therebetween. A pair of mounting holes 32 is defined in the rear portion 34a, corresponding to the mounting posts 25 of the first side plate 21. A projection 33 is stamped inwardly from the middle portion 34b, corresponding to the cutout 47 of the slide rail 40. The front portion 34c functions as a handle to manipulate the operation body 30. To facilitate manipulation of the operation body 30, a knob 35 is attached to the front portion 34c (see FIG. 3).

Figure 3:
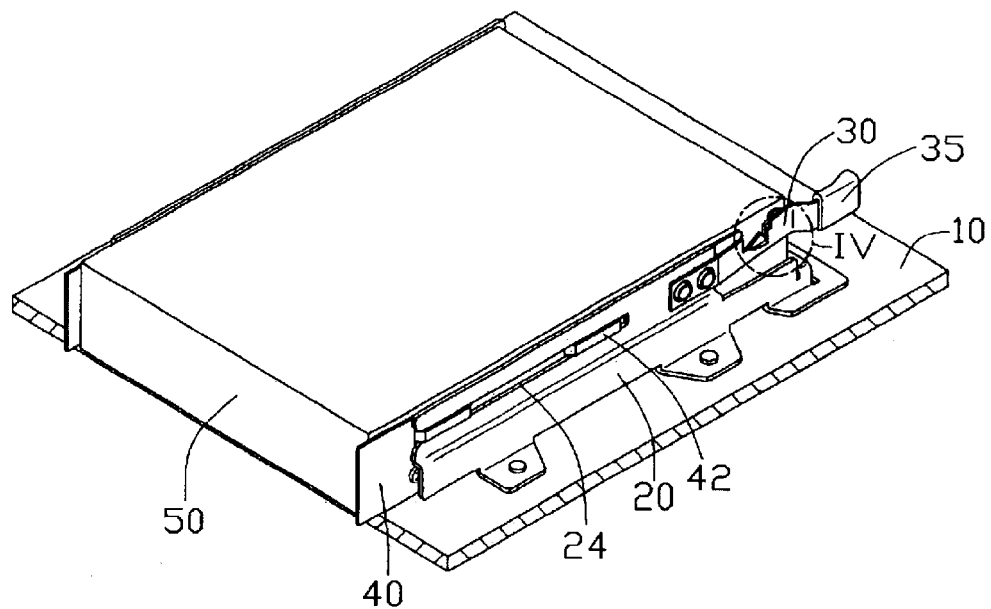
FIG. 3 is an assembled view of FIG. 1.
Figure 4:
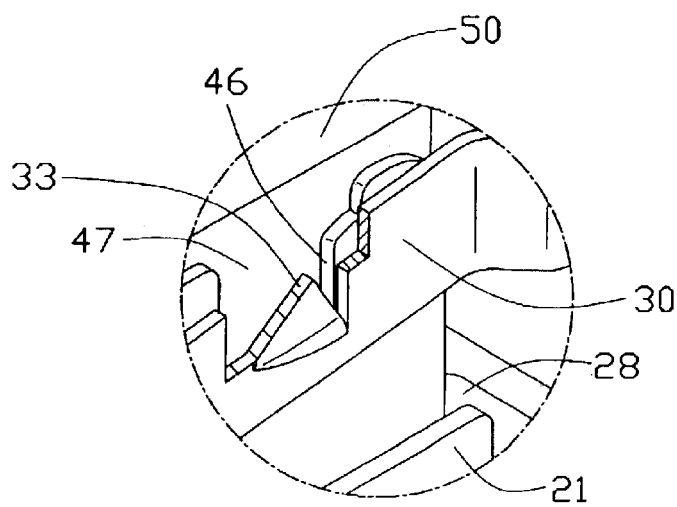
FIG. 4 is an enlarged view of an encircled portion IV of FIG. 3.

Referring to FIGS. 3 and 4, in assembly, the slide rails 40 are attached to the opposite sides of the data storage device 50 with the screws 60. The operation body 30 is fixedly attached to the first side plate 21. The mounting posts 25 of the first side plate 21 are extended through the mounting holes 32 of the operation body 30, and ends of the mounting posts 25 are expanded to retain the operation body 30 to the first side plate 21. Alternatively, other fastening means such as rivets may be used.

The combined data storage device 50 and slide rails 40 is placed at a rear side of the retaining bracket 20. The protrusions 42 are aligned with the slots 24. The data storage device 50 is pushed forwardly, so that the protrusions 42 slide forwardly along the slots 24. The blocking tab 46 rides over the projection 33 of the operation body 30, and the operation body 30 resiliently deforms slightly outwardly. Once the blocking tab 46 has completely ridden over the projection 33, the operation body 30 resiliently deforms back to its original position. Thus the projection 33 is snappingly engaged with the blocking tab 46, to prevent withdrawal of the data storage device 50 from the retaining bracket 20. Simultaneously, the detent tab 28 abuts a front side of the data storage device 50, to stop further forward movement of the data storage device 50. The data storage device 50 is thus securely and reliably mounted to the chassis 10 via the retaining bracket 20.

To remove the data storage device 50 from the chassis 10, the knob 35 is pushed outwardly to disengage the projection 33 from the blocking tab 46. The data storage device 50 is then pushed rearwardly along the slots 24 and removed from the retaining bracket 20.

In the present invention, the data storage device 50 is slidably attached to the retaining bracket 20, and operation body 30 is snappingly engaged with one slide rail 40. This allows quick and convenient installation and removal of the data storage device 50.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A mounting apparatus for a data storage device, comprising:
    a retaining bracket adapted to be fixedly mounted to a chassis, the retaining bracket defining a pair of opposite slots therein;
    a pair of rails adapted to be attached to opposite sides of the data storage device, each of the rails comprising a protrusion slidably engaging in a corresponding slot; and
    an operation member attached to the retaining bracket and defining a stop portion; wherein when the data storage device is slid into the retaining bracket in a first direction, the stop portion snappingly engages with a corresponding rail such that the data storage device is prevented from sliding out from the retaining bracket in a second direction that is opposite to the first direction.

2. The mounting apparatus as described in claim 1, wherein the retaining bracket comprises a base frame mounted to the chassis, and first and second side portions extending from opposite edge portions of the base frame, and the slots are defined in the first and second side portions respectively.

3. The mounting apparatus as described in claim 2, wherein at least one of the first and second side portions comprises a detent means at an end thereof, the detent means abutting an end of the data storage device for stopping further movement of the data storage device in the first direction.

4. The mounting apparatus as described in claim 1, wherein said corresponding rail defines a cutout corresponding to the stop portion of the operation member.

5. The mounting apparatus as described in claim 4, wherein said corresponding rail comprises a blocking tab formed at the cutout, and the stop portion comprises a projection snappingly engaging with the blocking tab.

6. The mounting apparatus as described in claim 5, wherein the operation member is resiliently deformable such that operation of the operation member can disengage the projection from the blocking tab.

7. An electrical device assembly comprising:
    an electrical device having rails attached on opposite sides thereof;
    a retaining bracket adapted to be fixedly mounted to a chassis and defining an inner space slidably receiving the electrical device therein;
    detent means formed on the retaining bracket to prevent the electrical device from moving too far in a first direction; and
    a resilient body attached to the retaining bracket, and releasably engaging with a corresponding rail to prevent movement of the electrical device in a second direction that is opposite to the first direction.

8. The electrical device assembly as described in claim 7, wherein the retaining bracket comprises a base frame adapted to be fixedly mounted to the chassis, and first and second side portions extending from opposite edge portions of the base frame.

9. The electrical device assembly as described in claim 8, wherein said detent means comprises at least one tab bent inwardly from at least one of the first and second side portions, the at least one tab abutting an end of the electrical device.

10. The electrical device assembly as described in claim 7, wherein said corresponding rail defines a blocking portion, and the resilient body comprises a projection releasably engaging with the blocking portion.

11. The electrical device assembly as described in claim 10, wherein the blocking portion comprises a blocking tab engaging with the projection when the data storage device is received in said inner space.

12. An electrical device assembly comprising:

an electrical device having two slide rails on two sides thereof, respectively;

a retaining bracket including two side plates defining a space therebetween to receive said electrical device therein;

interengaging means formed on the slide rails and the corresponding side plates to allow the electrical device to be forwardly inserted into said space from a rear end of the retaining bracket and guidably forwardly moved relative to the retaining bracket; and a resilient operation body attached to one of said side plates with one projection removeably received in a cutout of a corresponding one of said two slide rails to prevent rearward movement of the electrical device relative to the retaining bracket after said electrical device is fully assembled to the retaining bracket.

13. The assembly as described in claim 12, wherein said interengaging means includes one slot in the side plate and one protrusion on the corresponding slide rail 14. The assembly as described in claim 12, wherein each of said side plates defines an upper portion and a lower portion outwardly offset from the upper portion to receive screws of the electrical device, said screws fastening the corresponding slide rail to the electrical device.

15. The assembly as described in claim 14, wherein said interengaging means includes one slot in the side plate and one protrusion on the corresponding slide rail, and said slot is formed in the upper portion of the side plate.

16. The assembly as described in claim 12, wherein said operation body includes an operation end located at a front end of the retaining bracket.

* * * * *